United States Patent [19]

Nakamatsu et al.

[11] Patent Number: 5,136,045

[45] Date of Patent: Aug. 4, 1992

[54] PYRAZOLE CONTAINING METHINE COMPOUNDS

[75] Inventors: Toshio Nakamatsu, Osaka; Masanobu Terao, Hyogo, both of Japan

[73] Assignees: Sumitomo Chemical Company, Limited, Osaka; Daiei Chemical Company, Limited, Hyogo, both of Japan

[21] Appl. No.: 581,114

[22] Filed: Sep. 12, 1990

[30] Foreign Application Priority Data

Sep. 22, 1989 [JP] Japan .................. 1-247413

[51] Int. Cl.$^5$ .......................................... C07D 403/06
[52] U.S. Cl. .................................................. 548/364
[58] Field of Search ...................................... 548/364

[56] References Cited

U.S. PATENT DOCUMENTS

| | | | |
|---|---|---|---|
| 2,526,632 | 10/1950 | Brooker et al. | 548/364 |
| 2,766,233 | 10/1956 | Kartinos et al. | 548/364 |
| 2,840,443 | 6/1958 | Smith | 548/364 |
| 3,401,404 | 9/1968 | Seidel et al. | 96/99 |

FOREIGN PATENT DOCUMENTS

| | | |
|---|---|---|
| 0019299 | 5/1980 | European Pat. Off. . |
| 0257580 | 8/1987 | European Pat. Off. . |
| 1154894 | 9/1963 | Fed. Rep. of Germany . |
| 58-152054 | 2/1982 | Japan . |
| 551718 | 3/1943 | United Kingdom . |
| 912796 | 12/1962 | United Kingdom . |
| 929393 | 6/1963 | United Kingdom . |
| 929394 | 6/1963 | United Kingdom . |
| 929395 | 6/1963 | United Kingdom . |

OTHER PUBLICATIONS

Chemical Abstract No. 17759d.
Chemical Abstract No. 112480d.

*Primary Examiner*—Robert W. Ramsuer
*Attorney, Agent, or Firm*—Darby & Darby

[57] ABSTRACT

A methine compound represented by the following formula and an agent containing the same for coloring resins such as polystyrene, ABS.

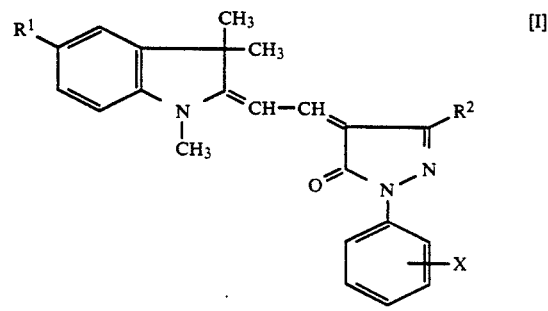

wherein $R^1$ is a hydrogen atom, a lower alkyl group, a lower alkoxy group, a nitro group or a lower carboxylic ester group; $R^2$ is a lower alkyl group, a lower carboxylic amide group or a lower carboxylic ester group; and X is $-SO_2NR^3R^4$, $-SO_2NCHNR^5R^6$ or $-SO_2R^7$, where $R^3$ and $R^4$ each is a hydrogen atom, a lower alkyl group or a phenyl group, $R^5$ and $R^6$ each is a lower alkyl group, and $R^7$ is a lower alkyl group or a hydroxyethyl group.

3 Claims, No Drawings

PYRAZOLE CONTAINING METHINE COMPOUNDS

The present invention relates to a novel methine compound and a coloring agent for resins which uses the methine compound.

Perinone compounds such as a compound represented by the following formula (A),

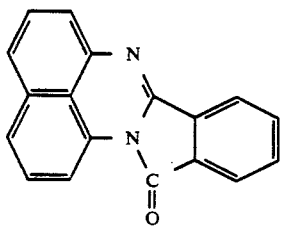

have been known as orange-coloring agents for resins. Though the perinone compounds are excellent in heat resistance and light resistance, the resin articles colored with them do not have sufficient extraction resistance and bleeding resistance. Furthermore, the perinone compounds stain metal molds, since they sublimate, and a large amount of the compounds is needed to obtain deep colored resin articles, since coloring ability of the perinone compounds is small.

The other coloring agent for resins is a methine compound represented by the following formula (B),

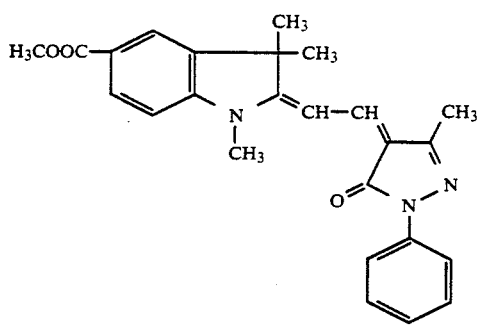

This compound has excellent heat resistance as well as extraction resistance. However, the polystyrene resin articles colored wit the compound are inferior in light resistance and are poor in bleeding resistance.

The inventors have found that a specific methine compound has excellent heat resistance and light resistance and the articles colored with it have excellent bleeding resistance and extraction resistance.

According to the present invention, a methine compound represented by the following formula [I] is provided:

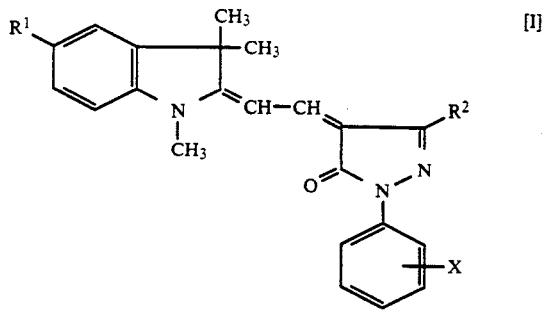

wherein $R^1$ is a hydrogen atom, a halogen atom, a lower alkyl group, a lower alkoxy group, a nitro group or a carboxylic acid lower alkyl ester group; $R^2$ is a lower alkyl group, a carboxylic acid amide group or a carboxylic acid lower alkyl ester group; and X is $-SO_2NR^3R^4$, $-SO_2NCHNR^5R^6$ or $-SO_2R^7$, where $R^3$ and $R^4$ each is a hydrogen atom, a lower alkyl group or a phenyl group, $R^5$ and $R^6$ each is a lower alkyl group and $R^7$ is a lower alkyl group or a hydroxyethyl group. Furthermore, the present invention provides coloring agents containing the same.

The methine compounds represented by the formula [I] are prepared by a condensation reaction between 2-methylene-indoline-ω-aldehyds of the formula [II].

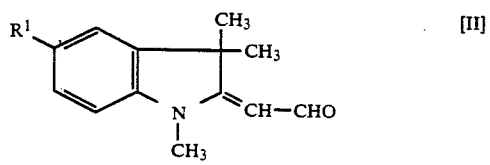

wherein $R^1$ is as defined in the formula [I], and 5-pyrazolone compounds by the formula [III],

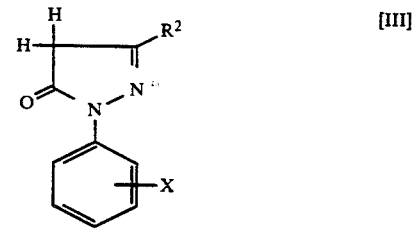

wherein X and $R^2$ are as defined in the formula [I]. Alternatively, the compounds (I) may be prepared by a condensation reaction between 1,3,3-trimethylindolenin compounds of the formula [IV],

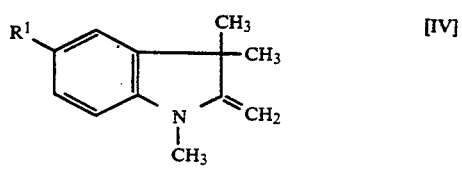

wherein $R^1$ is as defined above, and 4-formyl-5-pyrazolone compounds of the formula [V]

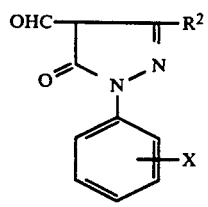

wherein X and R² are defined above.

These condensation reactions are carried out in acid or inert solvents in the presence of alkaline condensation agents, and preferably at the temperature of 50°–140° C. Dilution solvents may be used together with the acid solvents.

The acid solvents used in the condensation reaction include, for example, acetic acid glacial, acetic anhydride, formic acid, propionic acid, sulfuric acid and polyphosphoric acid. These may be used alone or in combination. The inert solvents used in the condensation reaction include alcohols such as methanol, ethanol or isopropyl alcohol; halobenzenes such as monochlorobenzene or orthodichlorobenzene; and alkylbenzenes such as toluene or xylene. These may be used alone or in combination.

The alkaline condensation agents used for the condensation reaction include pyridine, diethylamine, potassium hydroxide, and preferably piperidine.

Resins to which the compounds of the present invention are applied as a coloring agent include thermoplastic resins such as polystyrene, polymethyl methacrylate, polyvinyl chloride, acrylonitrile/butadiene/styrene copolymer (ABS resin), acrylonitrile/styrene copolymer (AS resin), polycarbonate, polyphenylene oxide, polypropylene, polyethylene, polyacrylonitrile, polyamide, polyacetal, polyethylene terephthalate, and polybutylene terephthalate and thermosetting resins such as phenolic resin, urea resin, melamine resin, unsaturated polyester resin, epoxy resin and diallyl phthalate resin.

Any method is applied to when coloring is made with coloring agents which contain the methine compounds of the present invention. One of the methods is that the resins are mixed with the coloring agent by a suitable method and then the mixture is subjected to injection molding, extrusion molding or spinning under heat and pressure. For instance, pellets or powders of the resin are mixed with pelletized or pulverized coloring agents of the formula I in a suitable mixer, if desired, with various additives, and then the mixture is treated in kneaders, roll mills, Banbury mixers, extruders or the like until the coloring agents are dissolved or dispersed in the resin. If desired, the colored resins may be molded in such a manner as compression, injection, extrusion or blow in order to obtain molded articles.

Alternatively, the coloring agents are added to monomers containing a suitable polymerization catalyst, followed by polymerization to obtain colored thermoplastic or thermosetting resins. The resulting colored resins are molded by a suitable method.

Amount of the coloring agents to be added is not critical, but 0.01–5% by weight, preferably 0.01–1% by weight on the basis of the resins, from an economical point.

Furthermore, other dyes and pigments usually used for coloring resins may additionally be used. For example, opaque colored articles are obtained by adding 0.1–1% by weight of titanium dioxide.

According to the present invention, methine compounds excellent in coloring ability, heat resistance and light resistance when used as coloring agents for resins, and colored resin articles having excellent extraction resistance and bleeding resistance are obtained.

The present invention is explained in more detail by the following nonlimiting Examples. In Examples, parts are by weight.

EXAMPLE 1

An aldehyde compound (4.7 parts) represented by the following formula

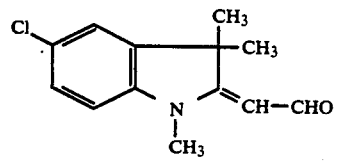

was allowed to react with pyrazolone compound (5.1 parts) represented by the following formula

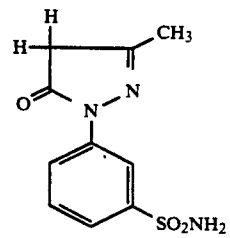

in acetic anhydride at 130° C. for a half hour. After cooling and dilution with isopropylalcohol were made, the resulting precipitate was filtered, washed with isopropyl alcohol and dried to obtain a cake (6.5 parts, yield 65%) of the methine compound of the following formula.

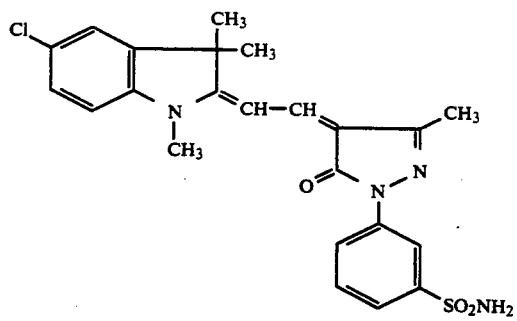

This compound showed a single orange spot in thin-layer-chromatograph and, FD-Mass of 470 which is the same as the calculated molecular weight. λ max in N,N-dimethylformamide: 480 nm, Melting point: 298°–299° C. (uncorrected).

The methine compound obtained (0.1 part) was blended with ABS resin (100 parts) and the resulting blend was subjected to extrusion at 205° C. using an extruder to obtain colored pellets. The pellets were molded at a cycle of 230° C.×1 minute using an injection molding machine to obtain plate-like molded articles colored in yellowish orange. The plate-like molded articles were excellent in bleeding resistance, light resistance and extraction resistance. When the injection molding was carried out at a cycle of 270° C.×3 minutes in place of the 230° C.×1 minute, shade of the resulting plate-like molded products was substantially the same as that obtained above. This demonstrated a superior heat resistance of the compound.

The methine compound was also excellent in coloring ability. The result is shown in Table I.

EXAMPLE 2

Example 1 was repeated except that an aldehyde compound (4.0 parts) of the following formula:

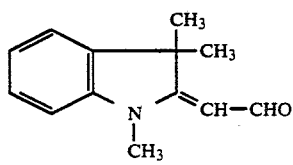

was used in place of the aldehyde compound to obtain a methine compound (5.0 parts, yield 57%) of the formula:

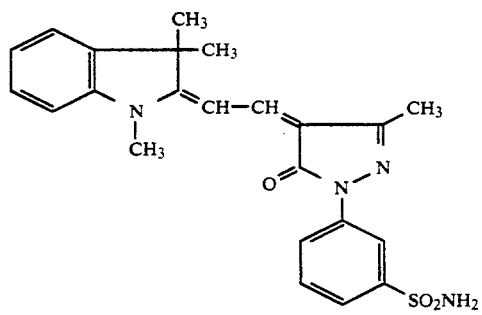

This compound showed a single orange spot in thin-layer chromatograph. λ max (in N,N-dimethylformamide): 478 nm, Melting point: 239°–241° C. (uncorrected).

Plate-like molded articles colored in yellowish orange were prepared in the same manner as in Example 1 using the methine compound (0.1 part) obtained above. The plate-like molded articles were excellent in bleeding resistance and light resistance. The heat resistance was as excellent as the articles of Example 1.

The methine compound had excellent coloring ability. The result is shown in Table 1.

EXAMPLE 3

Example 1 was repeated except that an aldehyde compound (4.9 parts) of the following formula:

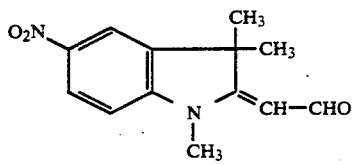

was used in place of the aldehyde compound to obtain a methine compound (8.4 parts, yield 87%) of the following formula

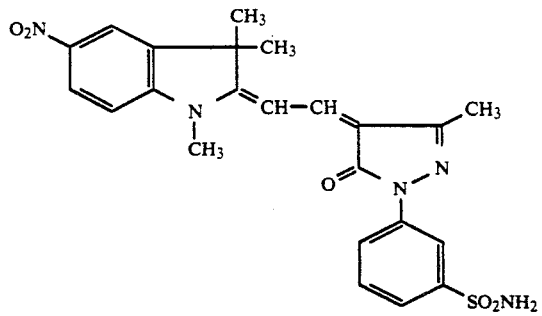

This compound showed a single orange spot in thin-layer chromatograph. λ max (in N,N-dimethylformamide): 492 nm, Melting point: 320° C. (uncorrected) or higher.

Plate-like molded articles colored in redish orange were prepared in the same manner as in Example 1 using the methine compound (0.1 part) obtained above. The plate-like molded articles were excellent in bleeding resistance and light resistance.

The methine compound had excellent coloring ability. The result in shown in Table 1.

EXAMPLE 4

An aldehyde compound (6.7 parts) of the following formula

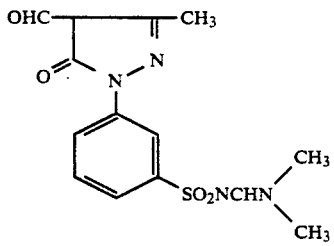

was allowed to react with an indolenine compound (5.3 parts) of the following formula

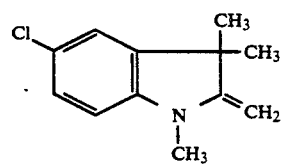

in methanol (32 parts) in the presence of piperidine (2 parts), for 5 hours under refluxing. After cooling was made, the resulting precipitate was filtered, washed with methanol and then water, and dried to obtain a cake of a methine compound (5.9 parts, yield 56%) represented by the following formula:

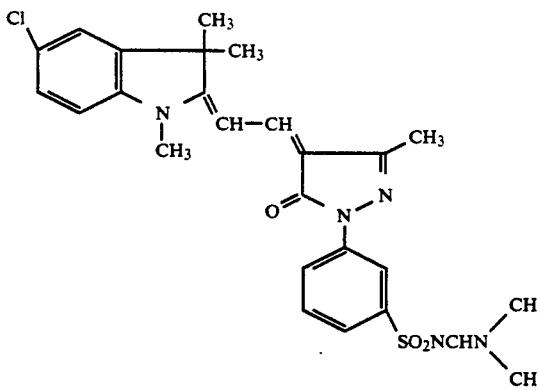

This compound showed a single orange spot in thin-layer chromatograph. λ max (in N,N-dimethylformamide): 479 nm, Melting point 260°–262° C. (uncorrected).

Plate-like molded articles colored in yellowish orange were prepared in the same manner as in Example 1 using the methine compound (0.1 part) obtained above. The plate-like molded articles were excellent in bleeding resistance, light resistance and extraction resistance. When the injection molding was carried out at a cycle of 270° C.×3 minutes in place of the 230° C.×1 minute, shade of the resulting plate-like molded products was substantially the same as those obtained above. This demonstrates a superior heat resistance of the compound.

This methine compound was also excellent in coloring ability. The result is shown in Table I.

COMPARATIVE EXAMPLE 1

Molded articles were prepared in the same manner as in Example 1 using the compound (A) (0.1 part) mentioned above. The result is shown in Table 1.

Properties in Table 1 were evaluated according to the following methods.
(1) Coloring ability: gram adsorption constant of the compound.
(2) Bleeding resistance: A colored molded ABS plate was laid on a soft polyvinylchloride plate containing $TiO_2$ (1.0 wt %), and pressed under pressure of 100 g/cm at 80° C. for 2 hours. The degree of coloring on the soft polyvinylchloride plate was evaluated according to the JIS-L-0805 Grey scale for assessing staining.
(3) Light resistance: An accelerated test was conducted with an Fade-Ometer according to JIS-L-0842. After simultaneous irradiation, evaluation was conducted with blue scale.
(4) Heat resistance: Molding of colored pellets of ABS resin was carried out at a cycle of 270° C.×3 minutes, and change in color was measured according to JIS-L-0804 Grey scale for assessing change in color to evaluate heat resistance. A molded product of colored pellets of ABS resin at a cycle of 230° C.×1 minute was used as the standard.
(5) Sublimation: A dye (10 wt % based on resin) was kneaded into resin, and heated at 220°–240° C. Stain on filter paper impregnated with dioctylphthalate was evaluated according to JIS Grey scale for assessing staining.

TABLE 1

| | Coloring ability (A/g) | Bleeding resistance grade | Light resistance grade | Heat resistance grade | Sublimation grade |
|---|---|---|---|---|---|
| Example 1 | $1.2 \times 10^2$ | 4–5 | No change in color $\geq 7$ | 4–5 | 4–5 |
| Example 2 | $1.2 \times 10^2$ | 4 | No change in color $\geq 7$ | 4–5 | 4–5 |
| Example 3 | $1.1 \times 10^2$ | 4 | No change in color $\geq 7$ | 4 | 4–5 |
| Example 4 | $1.0 \times 10^2$ | 4 | No change in color $\geq 7$ | 4–5 | 4–5 |
| Comparative example 1 | $0.27 \times 10^2$ | 3–4 | 5–6 | 4–5 | 2–3 |

Table 1 shows that the methine compound of the present invention has excellent coloring ability, and the resin articles colored with the methine compound are excellent in light resistance and sublimation property, and have good heat resistance.

COMPARATIVE EXAMPLE 2

The compound (B) (0.05 part) and polystyrene resin (100 parts) were kneaded and extruded at 205° C. to obtain colored pellets.

Injection molding of the colored pellets was carried out at a cycle of 220° C.×1 minute to obtain molded articles. The result is shown in Table 2.

EXAMPLES 5–8

Comparative example 2 was repeated except that the methine compounds obtained in Examples 1–4 were used in place of the compound (B). The results are shown in Table 2.

TABLE 2

| | Compound | Light resistance (grade) | Extraction resistance* (n-heptane) | Bleeding resistance (grade) |
|---|---|---|---|---|
| Example 5 | example 1 | 5–6 | x | 4–5 |
| Example 6 | example 2 | 5 | x | 4–5 |
| Example 7 | example 3 | 5–6 | x | 4–5 |
| Example 8 | example 4 | 6 | x | 5 |
| Comparative example 2 | B | 4 | None | 4–5 |

*x: extraction resistance is good.

Table 2 shows that the methine compounds of the present invention impart excellent light resistance, extraction resistance, etc., when polystyrene is used as resin.

EXAMPLE 9

Example 1 was repeated except that a pyrazolone compound (5.6 parts) of the following formula:

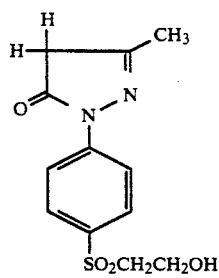

was used in place of the pyrazolone compound used therein to obtain a methine compound (8.5 parts, yield 85%) of the following formula.

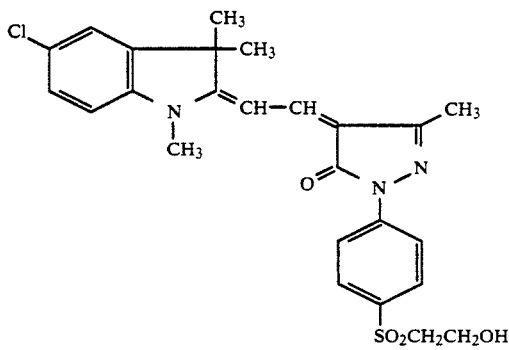

This compound showed a single orange spot in thin-layer chromatograph. λ max (in N,N-dimethylformamide): 481 nm, Melting point: 243°-249° C. (uncorrected).

Plate-like molded articles colored in yellowish orange were prepared in the same manner as in Example 1 using the methine compound (0.1 part) obtained above. The plate-like molded articles were excellent in bleeding resistance, extraction resistance, and light resistance. The heat resistance was as excellent as those of Example 1.

The methine compound had excellent coloring ability.

EXAMPLE 10

Example 4 was repeated except that an indolenine compound of the following formula:

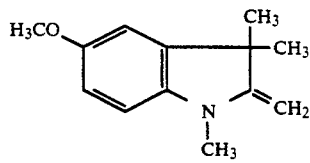

was used in place of the indolenine compound used therein to obtain a methine compound of the following formula.

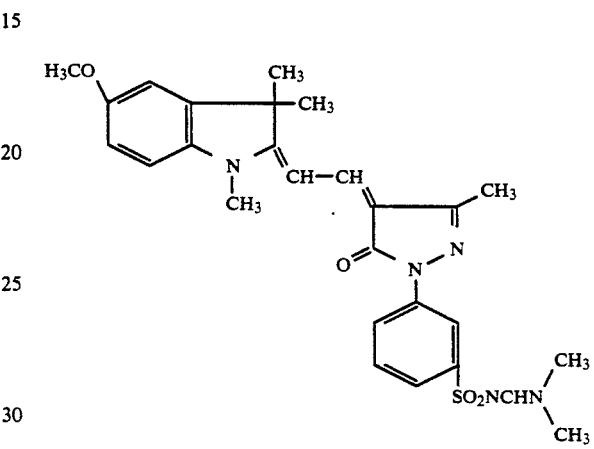

This compound showed a single orange spot in thin-layer chromatograph. λ max (in N,N-dimethylformamide): 488 nm, Melting point: 228°-229° C. (uncorrected).

The methine compound (0.05 part) thus obtained and polystyrene resin (100 parts) were kneaded and then extruded at 205° C. to obtain colored pellets. The colored pellets were injection molded at a cycle of 220° C.×1 minute to obtain molded articles in yellowish orange. The articles were excellent in bleeding resistance and light resistance.

The methine compound was excellent in coloring ability.

EXAMPLES 11-15

Methine compounds described in Table 3 were prepared in the same manner as in Example 1.

Molded articles were prepared in the same manner as in Example 1, by use of the methine compounds thus obtained for coloring.

The methine compounds had excellent coloring ability.

The molded articles had excellent bleeding resistance and light resistance, and good heat resistance as those obtained in Example 1.

TABLE 3

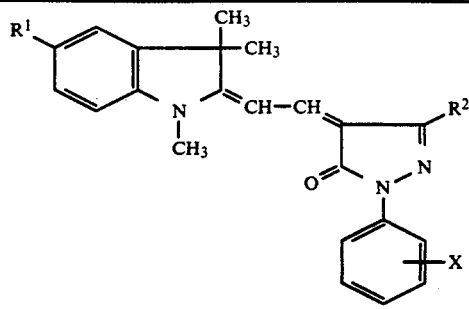

| Example | —R$^1$ | —R$^2$ | position of x | x | hue of the molded article |
|---|---|---|---|---|---|
| 11 | —H | —CH$_3$ | 4 | —SO$_2$CH$_2$CH$_2$OH | yellowish orange |
| 12 | —H | —NHCOOH | 3 | —SO$_2$NH$_2$ | " |
| 13 | —Cl | —COOC$_2$H$_5$ | 4 | —SO$_2$NH$_2$ | reddish orange |
| 14 | —COOCH$_3$ | —CH$_3$ | 4 | —SO$_2$N(CH$_3$)$_2$ | " |
| 15 | —Br | —CH$_3$ | 3 | —SO$_2$CH$_3$ | yellowish orange |

What we claim is;

1. A methine compound represented by the following formula [I]

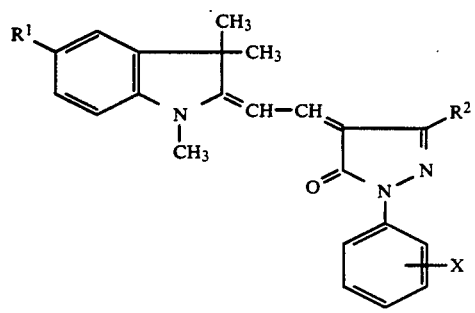

wherein R$^1$ is a hydrogen atom, a halogen atom, a lower alkyl group, a lower alkoxy group, a nitro group or a carboxylic acid lower alkyl ester group; R$^2$ is a lower alkyl group, a carboxylic acid amide group or a carboxylic acid lower alkyl ester group; and X is —SO$_2$NCHNR$^5$R$^6$ or —SO$_2$R$^7$, where R$^3$ and R$^4$ each is a hydrogen atom, a lower alkyl group or a phenyl group, R$^5$ and R$^6$ each is a lower alkyl group, and R$^7$ is a lower alkyl group or a hydroxyethyl group.

2. A methine compound according to claim 1 wherein X is —SO$_2$NCHNR$^5$R$^6$.

3. A compound of the formula

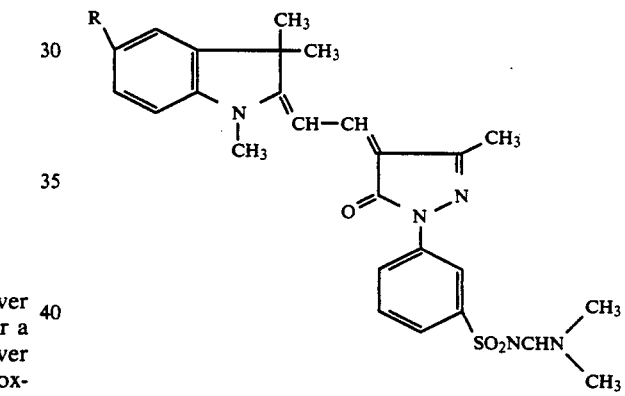

wherein R is a hydrogen atom or a chlorine atom.

* * * * *